(12) United States Patent
Karam et al.

(10) Patent No.: US 11,428,863 B2
(45) Date of Patent: Aug. 30, 2022

(54) DEVICES, SYSTEMS, AND METHODS FOR TEMPORAL COMPRESSION OR STRETCHING OF OPTICAL PULSES

(71) Applicant: EDMUND OPTICS, INC., Barrington, NJ (US)

(72) Inventors: Tony Karam, Voorhees, NJ (US); Lars Sandström, Philadelphia, PA (US); Nathan Carlie, Cherry Hill, NJ (US)

(73) Assignee: Edmund Optics, Inc., Barrington, NJ (US)

( * ) Notice: Subject to any disclaimer, the term of this patent is extended or adjusted under 35 U.S.C. 154(b) by 12 days.

(21) Appl. No.: 17/068,117

(22) Filed: Oct. 12, 2020

(65) Prior Publication Data
US 2021/0109280 A1 Apr. 15, 2021

Related U.S. Application Data

(60) Provisional application No. 62/914,049, filed on Oct. 11, 2019.

(51) Int. Cl.
*G02B 6/02* (2006.01)
*F21V 8/00* (2006.01)

(52) U.S. Cl.
CPC ............ *G02B 6/022* (2013.01); *G02B 6/0023* (2013.01); *G02B 6/02304* (2013.01)

(58) Field of Classification Search
CPC ...... G02B 6/022; G02B 6/0023; G02F 1/0131
See application file for complete search history.

(56) References Cited

U.S. PATENT DOCUMENTS

| | | | | |
|---|---|---|---|---|
| 5,960,016 A | * | 9/1999 | Perry | H01S 3/0057 372/25 |
| 2015/0117480 A1 | * | 4/2015 | Karavitis | H01S 3/0057 372/24 |
| 2016/0070041 A1 | * | 3/2016 | Apitz | G02B 5/285 359/589 |
| 2016/0149368 A1 | * | 5/2016 | Song | H01S 3/0057 372/25 |
| 2016/0294146 A1 | * | 10/2016 | Tsia | G02B 17/006 |
| 2017/0125964 A1 | * | 5/2017 | Russbueldt | H01S 3/0092 |

* cited by examiner

*Primary Examiner* — Sung H Pak
(74) *Attorney, Agent, or Firm* — Duane Morris LLP

(57) ABSTRACT

The disclosure relates generally to optical systems, and more particularly, optical systems for temporal compression or stretching of optical pulses.

19 Claims, 7 Drawing Sheets

DEVICES, SYSTEMS, AND METHODS FOR TEMPORAL COMPRESSION OR STRETCHING OF OPTICAL PULSES

CROSS-REFERENCE TO RELATED APPLICATIONS

This application claims the benefit of provisional patent application Ser. No. 62/914,049 titled "Devices, Systems, and Methods For Temporal Compression Or Stretching Of Optical Pulses" filed Oct. 11, 2019, the entirety of which is hereby incorporated by reference herein.

BACKGROUND

Stretching or compressing optical pulses can be useful in a variety of applications. One method of achieving stretching or compressing of pulses is the use of a long dispersive optical fiber to guide and propagate the light pulse. Because of the chromatic dispersion of the optical fiber, different frequency components experience different refractive indices and travel at different speeds along the fiber. This separates different frequency components in time. Optical fibers can also be used to compress pulses. This may be useful in telecommunications and in optical microscopy and imaging. However, the amount of stretching or compressing is limited by the length of the fiber. The acceptable wavelengths may also be restricted based on the material of the fiber. In addition, the pulses may experience linear dispersion that may distort the pulses.

SUMMARY

The present disclosure relates generally to optical systems, and more particularly, optical systems for temporal compression or stretching of optical pulses.

In one or more cases, the disclosed technology relates to an optical system. In one or more cases, the optical system includes a first optical component comprising a reflective surface disposed across from a second optical component. In one or more cases, the second optical component includes a non-flat reflective surface disposed across from the first optical component. In one or more cases, a portion of the first optical component is configured to allow an optical pulse to pass through the first optical component and reflect off the non-flat reflective surface. In one or more cases, at least one of the reflective surface and the non-flat reflective surface is coated with a group delay dispersion coating.

In one or more cases, the disclosed technology relates to a system including a light emitting device configured to generate an optical pulse, and an optical system. In one or more cases, the optical system includes a first optical component comprising a reflective surface disposed across from a second optical component. In one or more cases, the second optical component includes a non-flat reflective surface disposed across from the first optical component. In one or more cases, a portion of the first optical component is configured to allow the optical pulse to pass through the first optical component and reflect off the non-flat reflective surface. In one or more cases, at least one of the reflective surface and the non-flat reflective surface is coated with a group delay dispersion coating.

The foregoing and other objects, features, and advantages of the disclosure will be apparent from the following more particular descriptions of the embodiments as illustrated in the accompanying drawings.

BRIEF DESCRIPTION OF DRAWINGS

The features of the embodiments described herein will be more fully disclosed in the following detailed description, which is to be considered together with the accompanying drawings wherein like numbers refer to like parts and further wherein.

DETAILED DESCRIPTION

Figure 1:
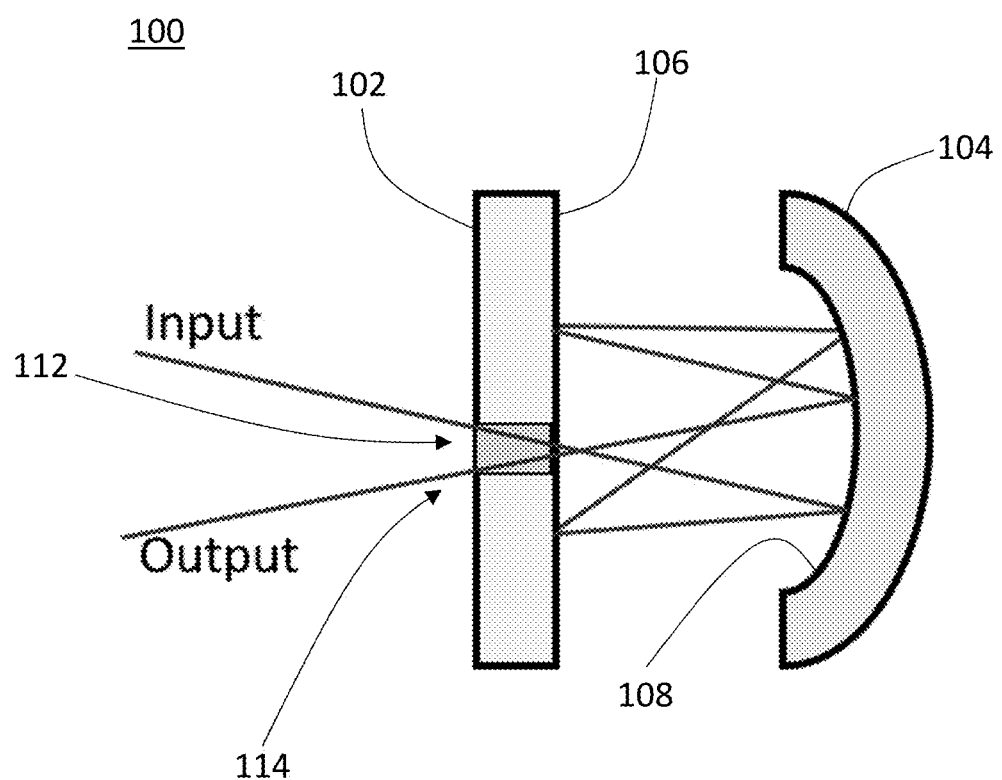
FIG. 1 shows an optical system according to one embodiment described herein.

The following description is provided as an enabling teaching of a representative set of examples. Many changes can be made to the embodiments described herein while still obtaining beneficial results. Some of the desired benefits discussed below can be obtained by selecting some of the features or steps discussed herein without utilizing other features or steps. Accordingly, many modifications and adaptations, as well as subsets of the features and steps described herein are possible and can even be desirable in certain circumstances. Thus, the following description is provided as illustrative and is not limiting.

This description of the embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" or "operably connected" is such an attachment, coupling or connection that allows the pertinent structures to operate as intended by virtue of that relationship. Unless otherwise defined, all technical and scientific terms used herein have the same meaning as commonly understood by anyone of ordinary skill level in the field to which this invention belongs.

As used herein, use of a singular article such as "a," "an" and "the" is not intended to exclude pluralities of the article's object unless the context clearly and unambiguously dictates otherwise.

Described herein are systems including two or more optically reflective surfaces. At least one of the optically reflective surfaces includes a negative or positive group delay dispersion (GDD) coating. Temporal compression or elongation of an optical pulse is achieved by reflecting a beam such that it contacts each of the optically reflective surfaces at least one time. The system may be arranged in a self-focusing design and may provide efficient alignment and enhanced compression or pulse stretching performance, and controlling beam divergence. Additionally, the refocusing cavity designs disclosed herein allow for long path lengths without requiring large mirrors.

Optical pulse stretching and compression may be used in many applications. For example, optical pulse stretching and compression may be used in imaging and spectroscopy systems. Optical pulse stretching and compression may also be used in telecommunications.

Figure 2:
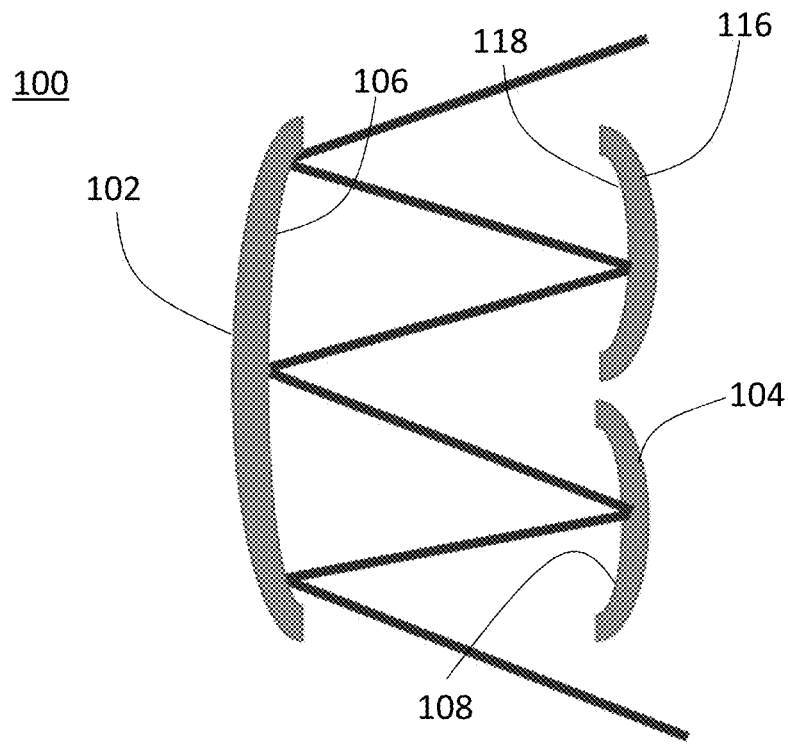
FIG. 2 shows an optical system according to another embodiment described herein.

As shown in FIG. 1, in one embodiment, an optical system 100 includes a first optical element 102 and a second optical element 104. Although only two optical elements are illustrated in FIG. 1, any number of optical elements can be used. For example, FIG. 2 illustrates a three-mirror optical system. The substrate of the optical components could be composed of various materials such as, for example, fused silica, N-BK7, or metal. A dielectric coating with negative group delay dispersion is applied on these substrates.

Figure 3:
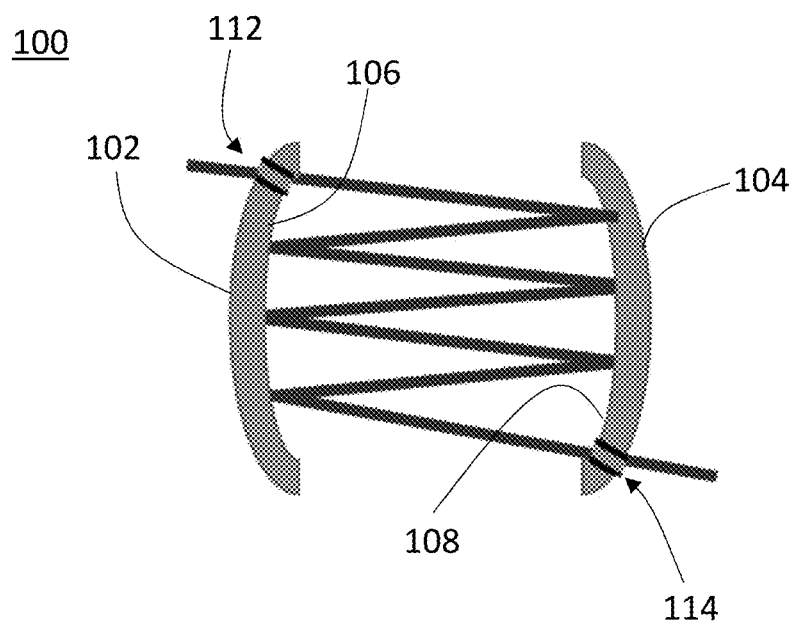
FIG. 3 shows an optical system according to another embodiment described herein.

In the illustrated embodiment, the first optical element 102 has a flat reflective surface 106. The second mirror 104 has a non-flat reflecting surface 108. The reflective surface 108 can have any appropriate geometry. For example, the reflective surface 108 may be spherical, aspherical (e.g. toroidal mirrors), cylindrical, acylindrical, or freeform (i.e., having no translational or rotational symmetry). In addition, the reflective surface 108 may be a metasurface to allow for refocusing of the optical beam and mitigating beam divergence as the beam reflects off of the reflective surfaces 106 and 108. Although one flat surface and one non-flat surface are shown in the illustrated embodiment, it should be understood that various arrangements of the optical elements are possible and within the scope of this disclosure. For example, in various embodiments, two optical elements with non-flat reflective surfaces are provided, as shown in FIG. 3. The reflective surfaces 106, 108 may be, for example, mirrors, filters, windows, or metasurfaces.

At least one of reflective surface 106 and reflective surface 108 is coated with a GDD coating. In various embodiments, the GDD is positive such that the system is configured to temporally stretch optical pulses. In various other embodiments, the GDD is negative such that the system is configured to temporally compress optical pulses. The optical coating may be composed of dielectric layers that are designed to give an overall negative group delay dispersion that can be used for pulse compression applications. This coating may be applied with various deposition or sputtering techniques. Examples of coating application techniques include electron deposition, ion-assisted deposition, magnetron sputtering, ion beam sputtering, and atomic layer deposition.

In one embodiment configured for stretching of optical pulses, the GDD of at least one of the reflective surfaces 106, 108 is greater than 20 fs$^2$. In at least one embodiment configured for compression of optical pulses, the GDD of at least one of the reflective surfaces 106, 108 is lower than −20 fs$^2$. In various embodiments, the total GDD of the system is greater than the GDD of the individual reflective surfaces, where the total GDD of the system is given by: $GDD_{Total} = \Sigma_n GDD_n \times R_n$, where $GDD_n$ is the average GDD of a single mirror, $R_n$ is the number of reflections on each mirrors, and n denotes the number of mirrors used in the setup. An additional combination of mirrors could be composed of one or more mirrors with negative GDD combined with one or more mirrors with negative third order dispersion (TOD).

Figure 9:
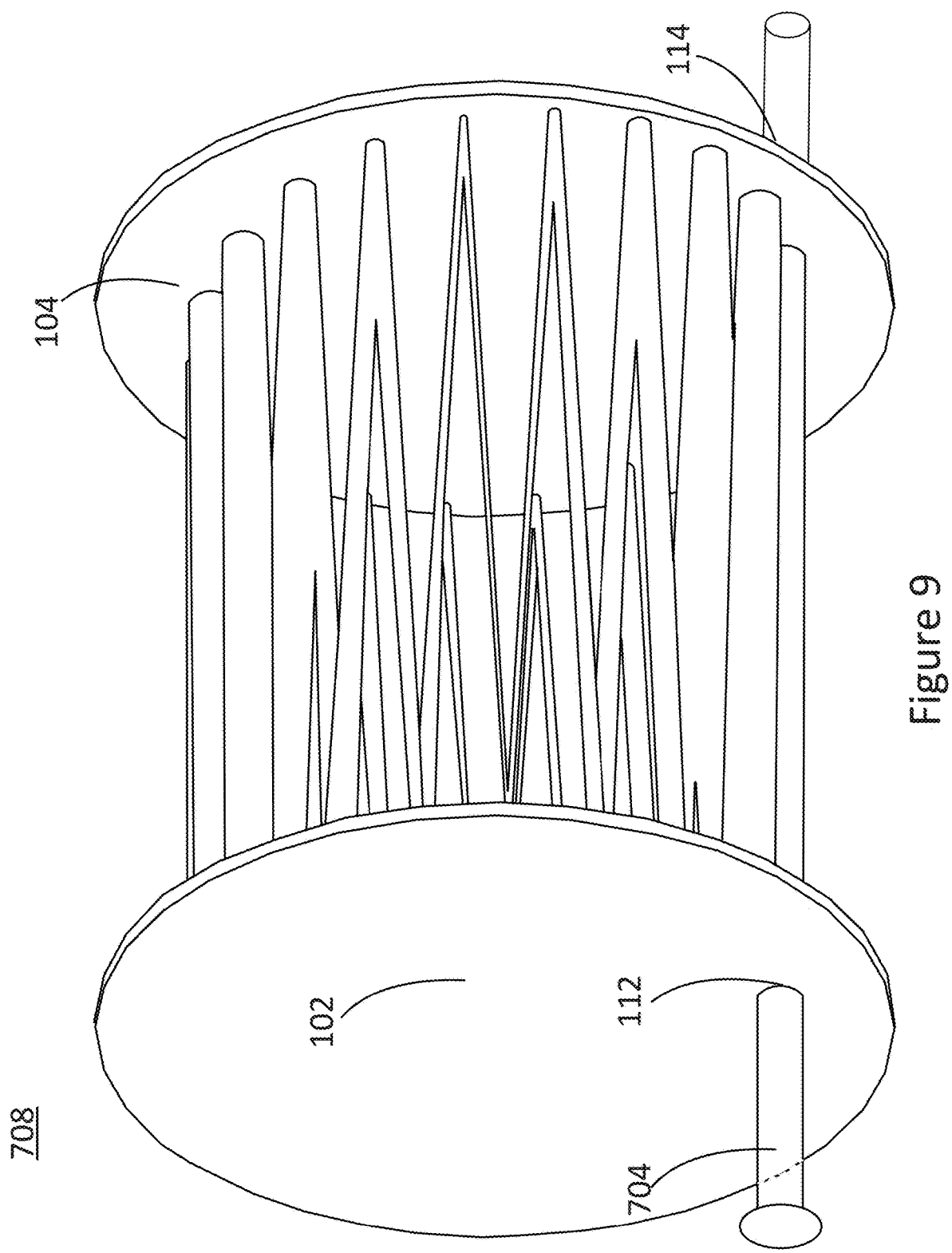
FIG. 9 illustrates an optical system of the example multi-pass compression cell.

As shown in FIG. 1, one of the optical elements may contain an inlet that allows an optical pulse to pass into the optical system. For example, as shown, the first optical element 102 may include an inlet 112. The inlet 112 can be, for example, an aperture in the optical element. In other embodiments, the inlet 112 is an uncoated portion of the optical element or a portion of the optical element that has a coating different than the reflective surface. In other embodiments, the inlet 112 may be a truncated edge or notch in the first optical element 102. In addition, one of the optical elements may contain an outlet 114. In the illustrated embodiment of FIG. 1, the inlet 112 and the outlet 114 are the same portion of first optical element 102. In other embodiments, the outlet 114 is a second aperture in the first optical element 102. In other embodiments, the outlet 114 is a portion of the second optical element 104, as illustrated in FIGS. 3 and 9. As with the inlet 112, the outlet 114 can be an aperture, an uncoated portion of the optical element, or a portion of the optical element having a different coating than the reflective surface.

In various embodiments, the beam reflects off of each of the optical elements 102, 104 multiple times. Each time, the beam may contact a different position on the optical elements 102, 104. As a result, no portion of the optical elements 102, 104 is repeatedly exposed to the high energy beam. This may increase the longevity and reliability of the system. Further, as illustrated in FIG. 9, the beam may reflect off the optical elements 102 and 104 in a curved path around the reflective surface 108 of the second optical element 104

In one embodiment, the inlet 112 is coupled to hollow core fiber. The hollow core fiber provides spectral broadening of the input laser pulses prior to entry into the optical system 100. This allows for additional broadening of the pulse bandwidth, which will in turn allow the system to achieve shorter pulses.

In various embodiments, the optical system 100 includes various alignment features. The alignment features may lead to efficient alignment and enhanced compression or stretching performance due to the increased number of reflections through the reflective surface(s) 106, 108. Examples of these alignment features include pinholes or slits added for the entrance and exit beam, mirror mounts with mounts that allow for alignment of the optical elements to the beam, and translation or rotational stages that allow for control of the distance between the mirrors.

The optical system 100 may be used to compress laser pulses with any appropriate pulse duration, including, but not limited to, pulse durations on the femtosecond (fs), picosecond (ps), and nanosecond (ns) scale. Further, the optical system 100 may be used to stretch laser pulses of any appropriate pulse duration, including, but not limited to, pulse durations on the femtosecond and picosecond scale.

The distance between the optical elements 102, 104 may be any appropriate distance. In typical applications, the distance between two mirrors can range from 2 inches to greater than 100 inches.

In one embodiment, the distance between the first optical element 102 and the second 104 is adjustable. Adjustment of this distance may lead to a change in the number of times the optical pulse is reflected off of the reflective surfaces 106, 108 before exiting through the outlet 114. The distance may be adjustable in discrete increments that are predetermined to correlate with specific numbers of reflections of the optical pulse within the optical system 100. The distance may be adjustable manually or automatically. Moreover, the rotation angle between the first optical element 102 and the second optical element 104 is adjustable to a change in the number of times the optical pulse is reflected off of the reflective surfaces 106, 108 before exiting through the outlet 114.

The optical system 100 can be used to compress or stretch pulses of various wavelengths, such as, for example, from ultraviolet to infrared. The mirror design may be optimized for a particular wavelength range depending on the wavelength of the incident laser beam.

In one embodiment, the optical system 100 is actively cooled, or thermally-isolated, or inert gas-purged to limit temperature fluctuations of the system and ensure highest beam quality for demanding applications. Additionally, or alternatively, the optical system 100 may be under complete or partial vacuum conditions which may be advantageous for extremely short ultrafast lasers that require vacuum conditions.

In another embodiment, as shown in FIG. 3, both optical elements 102, 104 are non-flat. For example, both optical elements 102, 104 can have a concave reflective surface. Further, as shown in FIG. 3, the first optical component 102 can include the inlet 112 and the second optical component 104 can include the outlet 114. After entering through the inlet 112, the beam can be reflected between the reflective surfaces 106, 108 multiple times to compress or expand the beam before exiting through the outlet 114. In other embodiments, an optical system may include the optical element 102 having a flat-reflective surface and optical element 104 having a non-flat reflective surface, as illustrated in FIGS. 1 and 9. In some cases, the optical system may be configured such that the beam reflects off of the optical element 104 and exits the optical element 102. In some other cases, the optical system, such as optical system 708, may be configured such that the beam reflects off of the optical element 102 and exits the optical element 104.

In the embodiment shown in FIG. 2, the optical system 100 includes a third optical element 116 having a reflective surface 118. The third optical element 116 may be arranged adjacent to the second optical element 104 such that the beam can reflect between the first, second, and third optical elements 102, 104, 116. In some embodiments, the second 104 and third 116 optical components have different reflective characteristics such that the compression or stretching of the pulse can be tailored as desired.

The optical systems described herein may be incorporated into, or used with, various other systems. For example, the optical systems described herein can be incorporated into a multifocal plane microscopy system. The optical systems described herein can replace multi-mirror arrays and, thereby, greatly simplify the alignment. The optical systems described herein may also include one or more optical mediums such as, for example, an objective, an acousto-optic modulator, a window, or a lens, positioned between the optical elements 102 and 104 to direct the beam. In some cases, the optical medium may be coated with a GDD coating.

Figure 4:
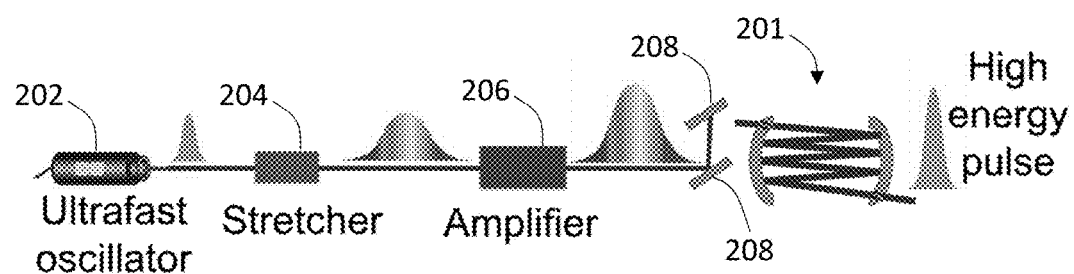
FIG. 4 illustrates a chirped pulse modification system including a compressor system according to embodiments described herein.

FIG. 4 illustrates a system 200 including a compressor 201 according to the embodiments described herein (e.g., as shown in FIGS. 1-3 and 9, and as described above). The system 200 includes an oscillator 202 (e.g., an ultrafast laser oscillator) to generate an optical pulse. The system 200 further includes a stretcher 204 to stretch the pulse duration of the optical pulse. The stretcher 204 can include, for example, optical fibers, dispersive prism pairs, diffraction gratings, grisms, or Bragg gratings. The system 200 can further include an amplifier 206 to amplify the optical pulse. The amplifier 206 can include, for example, laser amplifiers, amplifiers based on optical nonlinearities, or ultrafast amplifiers. In some embodiments, the system 200 includes a chain of multiple amplifiers of the same or different types. The system 200 can further include one or more mirrors 208 for directing the pulse as desired for alignment with the compressor 201.

As shown, the oscillator 202 generates the pulse and directs it toward the stretcher 204. After exiting the stretcher 204, the pulse enters the amplifier 206 for amplifying the magnitude of the pulse. The pulse is then directed by the one or more mirrors 208 before entering the compressor 201. As shown in FIG. 4, the system generates a high energy pulse.

Figure 5:
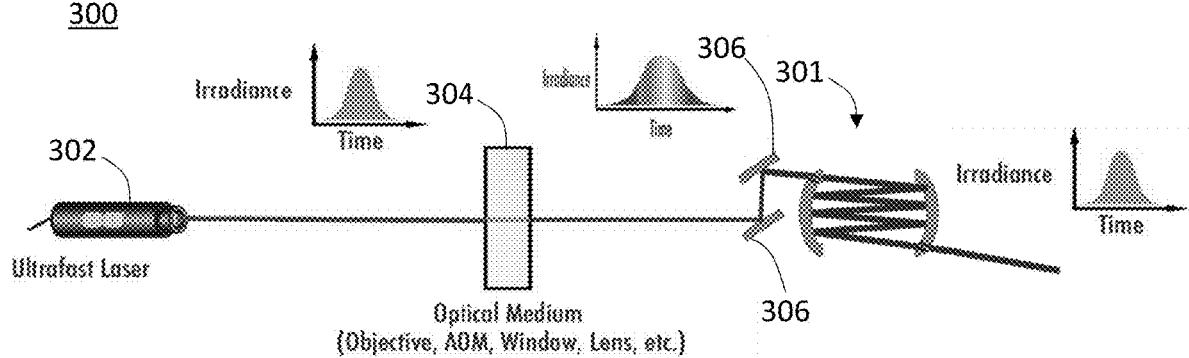
FIG. 5 illustrates a system for dispersion compensation of chirped ultrafast pulses including a compressor according to embodiments described herein.

FIG. 5 illustrates a system 300 for dispersion compensation of chirped ultrafast pulses including a compressor 301 according to embodiments described herein. The system 300 includes a laser 302 for generating chirped ultrafast pulses. The system 300 may further include an optical medium 304 such as, for example, an objective, an acousto-optic modulator, a window, or a lens. The system 300 may further include one or more mirrors 306 for directing the pulse as desired for alignment with the compressor 301.

The laser 302 is configured to generate a pulse and direct it toward the optical medium 304. After exiting the optical medium 304, the pulse is directed by the one or mirrors 306 toward the compressor 301. The compressor 301 may correct all or some of the dispersion caused by the optical medium 304.

Figure 6:
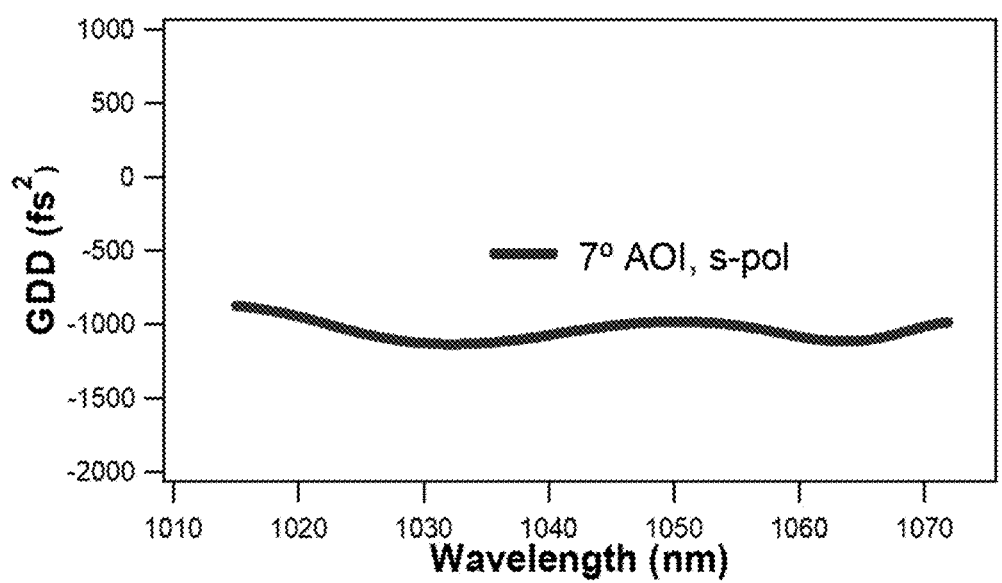
FIG. 6 illustrates an example measured group delay dispersion spectrum of an example multi-pass compression cell.

In an example, the optical system 708 of FIG. 9 was used to determine a GDD spectrum of an example dispersive mirror coating applied to the reflective surface 106 and reflective surface 108. In this example, incident ultrafast pulses 704 (e.g., the example beam illustrated in FIG. 9) enter through the inlet 112 of the first optical component 102, reflect of the reflective surfaces 106 and 108 multiple times, and exit the outlet 114 of the second optical component 104. In this example, the first optical component 102 has a flat reflective surface, and the second optical component 104 has a concave reflective surface. To create the multi-pass compression cell, each reflective surface 106 and 108 is coated with a GDD coating of $-1,000$ $fs^2$ and reflectivity of $>99.9\%$ between 1010 nanometers (nm) and 1070 nm. In this example, a white-light interferometer at 7° angle of incidence (AOI) was used to measure the GDD of the multi-pass compression cell, and produced the measured GDD spectrum illustrated in FIG. 6.

Figure 7:
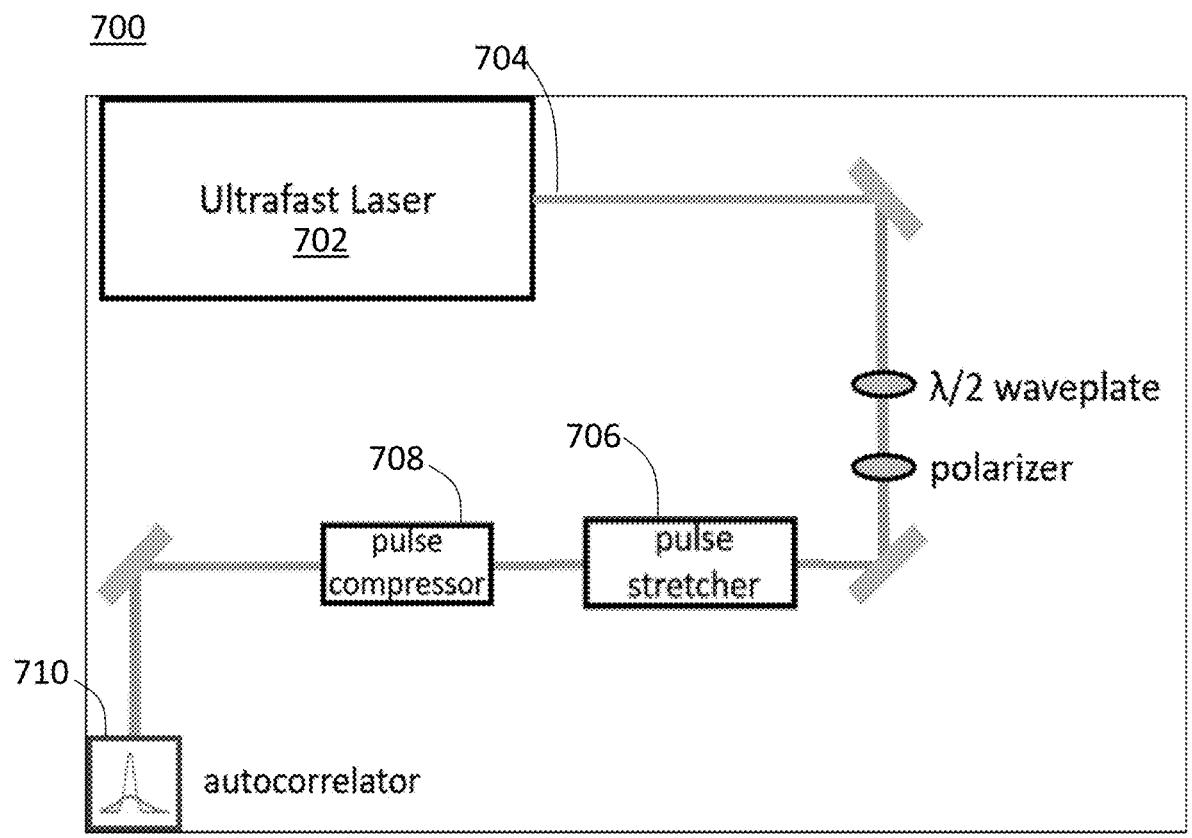
FIG. 7 illustrates an example laser system used to test performance of the example multi-pass compression cell.
Figure 8:
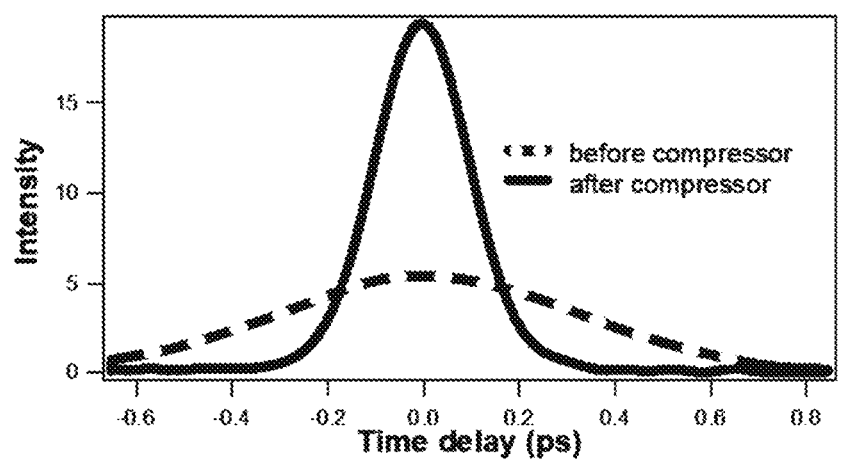
FIG. 8 illustrates an autocorrelation measurement of a laser pulse duration with and without the example multi-pass compression cell.

In order to test the compression performance of example optical system 708 (i.e., the pulse compressor), an ultrafast laser system 700 as illustrated in FIG. 7 was employed consisting of an ultrafast laser 702 having a Yb:doped fiber laser with 1040 nm center wavelength, 140 fs pulse duration, and 18 W average power at 80 MHz repetition rate to output beam 704. The beam 704 passes through pulse stretcher 706, in which the 140 fs pulse is stretched to 600 fs. In an example, the pulse stretcher 706 may be a grating-based stretcher. The beam 704 passes through is the pulse compressor 708, which includes the multi-pass optical system 100. By changing the distance between the first and second optical components 102 and 104 in the pulse compressor 708, the number of reflections can be tuned. After multiple bounces, the pulse compressor 708, via the system 100, compresses the pulse of the beam 704 back to 140 fs. Having passed through the pulse compressor 708, the beam 704 may enter and be measured by an autocorrelator 710. FIG. 8 illustrates the autocorrelation measurement of the pulse of the beam 704 without passing through the pulse compressor 708 and with passing through the pulse compressor 708. The signal of the autocorrelation measurement was fit using a $sech^2$ function.

Adding the dispersive mirrors, such as the first and second optical components 102 and 104, to a multi-pass cell configuration advantageously creates a compact, tunable, and alignment-free ultrafast compressor. Further, by refocusing the beam with one or more reflections off the second optical component, the divergence of the beam may be mitigated or reduced. The careful optical design of the systems described herein obtain high-quality beams. As such, these systems can be used in CPA laser systems or for dispersion compensation in any ultrafast laser system that requires careful control and fine-tuning of the pulse duration.

While the foregoing description and drawings represent preferred or exemplary embodiments of the present disclosure, it will be understood that various additions, modifications and substitutions may be made therein without departing from the spirit and scope and range of equivalents of the embodiments described herein. In particular, it will be clear to those skilled in the art that the embodiments disclosed herein may be embodied in other forms, structures, arrangements, proportions, sizes, and with other elements, materials, and components, without departing from the spirit or essential characteristics thereof.

What is claimed is:

1. An optical system comprising:
   a first optical component including a reflective surface opposing a second optical component, and
   the second optical component including a non-flat reflective surface opposing the first optical component, wherein
   a portion of the first optical component allows an optical pulse to pass through the first optical component and reflect off the non-flat reflective surface,
   an arrangement of the first optical component and the second optical component defines a self-focusing cavity that refocuses the optical pulse and controls divergence of the optical pulse,
   at least one of the reflective surface and the non-flat reflective surface is coated with a group delay dispersion (GDD) coating,
   a distance and a rotation angle between the first optical component and the second optical component are adjustable to change a number of times the optical pulse reflects off the reflective surface and the non-flat reflective surface before exiting the optical system without changing optical alignment,
   the distance between the first optical component and the second optical component is adjustable in discrete increments that are predetermined to correlate with specific numbers of reflections of the optical pulse within the optical system while controlling the divergence of the optical pulse, and
   the rotation angle between the first optical component and the second optical component is adjustable to change the number of times the optical pulse is reflected off the reflective surface and the non-flat reflective surface while controlling the divergence of the optical pulse.

2. The optical system of claim 1, wherein:
   the reflective surface includes a flat reflective surface, and
   the portion of the first optical component allows the optical pulse reflected off the second optical component to exit the optical system.

3. The optical system of claim 1, wherein:
   the reflective surface includes a non-flat reflective surface to reflect the optical pulse from a portion of the second optical component to another portion of the second optical component, and
   the other portion of the second optical component is allows the optical pulse to exit the optical system.

4. The optical system of claim 1, wherein the portion of the first optical component comprises a truncated edge, notch, or hole and is coupled to a hollow core fiber.

5. The optical system of claim 1, wherein the GDD coating comprises a negative GDD coating that temporally compresses the optical pulse passing through the optical system.

6. The optical system of claim 5, wherein a GDD of at least one of the reflective surface of the first optical component and the non-flat reflective surface of the second optical component is less than −20 femtoseconds$^2$ (fs$^2$).

7. The optical system of claim 1, wherein the GDD coating includes a positive GDD coating that stretches the optical pulse passing through the optical system.

8. The optical system of claim 7, wherein a GDD of at least one of the reflective surface of the first optical component and the non-flat reflective surface of the second optical component is greater than 20 femtoseconds$^2$ (fs$^2$).

9. The optical system of claim 1, wherein the optical system compresses or stretches the optical pulse based on a type of wavelength.

10. The optical system of claim 1, wherein the optical system is actively cooled, thermally isolated, or inert gas-purged.

11. The optical system of claim 1, wherein either the first optical component or the second optical component allows the optical pulse to exit the optical system.

12. The optical system of claim 1, wherein the reflective surface comprises a flat reflective surface.

13. The optical system of claim 1, wherein the reflective surface comprises a non-flat reflective surface.

14. A system comprising:
    a light emitting device that generates an optical pulse; and
    an optical system that receives the optical pulse from the light emitting device, the optical system including:
    a first optical component including a reflective surface opposing a second optical component, and
    the second optical component including a non-flat reflective surface opposing the first optical component, wherein
    a portion of the first optical component allows the optical pulse to pass through the first optical component and reflect off the non-flat reflective surface,
    an arrangement of the first optical component and the second optical component defines a self-focusing cavity that refocuses the optical pulse and controls divergence of the optical pulse, at least one of the reflective surface and the non-flat reflective surface is coated with a group delay dispersion (GDD) coating, a distance and a rotation angle between the first optical component and the second optical component are adjustable to change a number of times the optical pulse reflects off the reflective surface and the non-flat reflective surface before exiting the optical system without changing optical alignment, the distance between the first optical component and the second optical component is adjustable in discrete increments that are predetermined to correlate with specific numbers of reflections of the optical pulse within the optical system while controlling the divergence of the optical pulse, and the rotation angle between the first optical component and the second optical component is adjustable to change the number of times the optical pulse is reflected off the reflective surface and the non-flat reflective surface while controlling the divergence of the optical pulse.

15. The system of claim 14, further comprising a stretcher to stretch a pulse duration of the optical pulse, the stretcher receiving the optical pulse from the light emitting device and transmitting the optical pulse to the optical system.

16. The system of claim 14, wherein the light emitting device comprises an ultrafast laser oscillator or amplifier.

17. The system of claim 14, wherein either the first optical component or the second optical component allows the optical pulse to exit the optical system.

18. The system of claim 11, wherein the GDD coating includes a negative GDD coating to compress the optical pulse passing through the optical system.

19. The system of claim 11, wherein the GDD coating includes a positive GDD coating to stretch the optical pulse passing through the optical system.

* * * * *